(12) United States Patent
Attali

(10) Patent No.: US 8,202,098 B2
(45) Date of Patent: Jun. 19, 2012

(54) METHOD OF MODEL SCALING FOR AN AUTOMATED ESSAY SCORING SYSTEM

(75) Inventor: Yigal Attali, Lawrenceville, NJ (US)

(73) Assignee: Educational Testing Service, Princeton, NJ (US)

( * ) Notice: Subject to any disclaimer, the term of this patent is extended or adjusted under 35 U.S.C. 154(b) by 307 days.

(21) Appl. No.: 11/364,165

(22) Filed: Feb. 28, 2006

(65) Prior Publication Data

US 2006/0194183 A1 Aug. 31, 2006

Related U.S. Application Data

(60) Provisional application No. 60/657,124, filed on Feb. 28, 2005.

(51) Int. Cl.
*G09B 3/00* (2006.01)
(52) U.S. Cl. ......... 434/322; 434/323; 434/353; 434/354
(58) Field of Classification Search .................. 434/118, 434/322, 323, 353, 354, 362, 363
See application file for complete search history.

(56) References Cited

U.S. PATENT DOCUMENTS

| | | | |
|---|---|---|---|
| 4,930,077 A | | 5/1990 | Fan |
| 5,604,839 A | | 2/1997 | Acero et al. |
| 5,827,070 A | * | 10/1998 | Kershaw et al. ............. 434/322 |
| 5,987,302 A | * | 11/1999 | Driscoll et al. ............. 434/353 |
| 5,991,595 A | * | 11/1999 | Romano et al. ............. 434/353 |
| 6,085,206 A | | 7/2000 | Domini et al. |
| 6,115,683 A | | 9/2000 | Burstein et al. |
| 6,181,909 B1 | | 1/2001 | Burstein et al. |
| 6,234,806 B1 | * | 5/2001 | Trenholm et al. ............. 434/322 |
| 6,254,395 B1 | | 7/2001 | Breland et al. |
| 6,269,368 B1 | | 7/2001 | Diamond |
| 6,356,864 B1 | | 3/2002 | Foltz et al. |
| 6,366,759 B1 | | 4/2002 | Burstein et al. |
| 6,473,730 B1 | | 10/2002 | McKeown et al. |
| 6,502,756 B1 | | 1/2003 | Fahraeus |

(Continued)

FOREIGN PATENT DOCUMENTS

GB 2411028 8/2005

(Continued)

OTHER PUBLICATIONS

Automated Essay Grading System Applied to a First Year University Subject—How Can We do it Better? John Palmer, Robert Williams & Heinz Dreher. Curtin University of Technology, Perth, WA, Australia. Jun. 2, 2002.*

(Continued)

*Primary Examiner* — Xuan Thai
*Assistant Examiner* — Bruk Gebremichael
(74) *Attorney, Agent, or Firm* — Jones Day

(57) ABSTRACT

A method and system for customizing an automated essay scoring system are disclosed. Relative weights may be assigned to a plurality of features for a plurality of benchmark essay responses. Based on the relative weights, automated scores may be determined for one or more first essay responses to a first prompt. The automated scores may be scaled based on one or more scoring standards for the first prompt. A scaled automated score may be assigned for a second essay response to the first prompt based on the scaled automated scores for the one or more first essay responses.

9 Claims, 3 Drawing Sheets

U.S. PATENT DOCUMENTS

| | | |
|---|---|---|
| 6,523,026 B1 | 2/2003 | Gillis |
| 6,651,057 B1* | 11/2003 | Jin et al. ............................ 707/5 |
| 6,751,621 B1 | 6/2004 | Calistri-Yeh et al. |
| 6,796,800 B2 | 9/2004 | Burstein et al. |
| 7,062,485 B1* | 6/2006 | Jin et al. ............................ 707/3 |
| 2002/0001795 A1* | 1/2002 | Bejar et al. .................... 434/350 |
| 2002/0046018 A1 | 4/2002 | Marcu et al. |
| 2002/0142277 A1 | 10/2002 | Burstein et al. |
| 2003/0031996 A1 | 2/2003 | Robinson |
| 2003/0087223 A1* | 5/2003 | Walker et al. ................. 434/353 |
| 2003/0149692 A1 | 8/2003 | Mitchell |
| 2003/0160944 A1 | 8/2003 | Foote et al. |
| 2004/0014016 A1* | 1/2004 | Popeck et al. ................. 434/322 |
| 2004/0175687 A1 | 9/2004 | Burstein et al. |
| 2004/0194036 A1* | 9/2004 | Wolska et al. ................. 715/531 |
| 2004/0202991 A1* | 10/2004 | Clark et al. .................... 434/322 |
| 2004/0229199 A1* | 11/2004 | Ashley et al. ................. 434/323 |
| 2005/0037324 A1* | 2/2005 | Sumimoto ..................... 434/322 |
| 2005/0142529 A1* | 6/2005 | Andreyev et al. ............. 434/362 |
| 2006/0035204 A1* | 2/2006 | LaMarche et al. ............ 434/350 |

FOREIGN PATENT DOCUMENTS

WO  2004/046956  6/2004

OTHER PUBLICATIONS

Attali et al., Automated Essay Scoring with E-rater V.2.0 (ETS Research Report Series), Princeton, NJ: ETS, Nov. 2005.

* cited by examiner

METHOD OF MODEL SCALING FOR AN AUTOMATED ESSAY SCORING SYSTEM

CLAIM OF PRIORITY

This application claims priority to, and incorporates herein by reference in its entirety, U.S. Provisional Application No. 60/657,124, entitled "Model Scaling for an Automated Essay Scoring System" filed on Feb. 28, 2005.

BACKGROUND

Essay exams have been administered to students at all grade levels to evaluate various skills such as writing, comprehension and/or communication. Essay exams have been used both in classroom environments and outside of the classroom. For instance, a company might utilize an essay exam in its hiring process to assess an applicant's ability to communicate effectively. Alternatively, a country, state or municipality might administer an essay exam to assess a foreign examinee's knowledge in a particular field prior to permitting him or her to practice in that jurisdiction. Other essay exams are administered to determine whether or not a student has attained a specified level of knowledge, or mastery, of a given subject in order for a college, university or other educational institution to grant course credit for that given subject. Additionally, essays have been used as part of standardized academic tests to evaluate a student's qualification for admittance into a college or university. Other standardized exams, such as an attorney's state bar exam or a medical doctor's board exam, generally include an essay portion in addition to a multiple choice portion and must be passed before a license to practice is granted by a state government.

Thus, standardized tests including essay-based questions are often administered to particular groups, such as students, prospective medical doctors, engineers, architects and/or attorneys. Because the scores assigned to such tests are-typically used by, for example, colleges, universities or state governments as a factor in determining whether an examinee will be admitted to study at a particular institution or to practice in a particular field, it is critical that these scores are accurate and correctly reflect the examinee's level of skill and knowledge in the subject tested.

Unlike multiple-choice exams, essay exams typically require human graders to grade the responses. Essay grading is laborious and, as a consequence, requires significantly more time to complete than machine-graded multiple-choice questions. Accordingly, computer-based automated essay scoring systems have been developed to reduce the effort required of human graders. Exemplary automated essay scoring systems are described in U.S. Pat. No. 6,181,909 to Burstein et al. and U.S. Pat. No. 6,366,759 to Burstein et al., each of which is incorporated herein by reference in its entirety.

Automated essay scoring systems typically require extensive data collection to build a model for grading essay responses. Such data collection limits the effectiveness of automated essay scoring systems since only essay responses from widely administered tests may be adequately graded using such systems.

It is therefore desirable to provide an automated essay scoring system that does not require extensive data collection.

It is further desirable to provide an automated essay scoring system that reduces the time required to grade essay responses.

The present disclosure is directed to solving one or more of the above listed problems.

SUMMARY

Before the present methods are described, it is to be understood that this invention is not limited to the particular, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Thus, for example, reference to a "score" is a reference to one or more scores and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in the practice or testing of the present invention, the preferred methods, devices, and materials are now described. All publications mentioned herein are incorporated herein by reference. Nothing herein is to be construed as an admission that the invention is not entitled to antedate such disclosure by virtue of prior invention.

The present methods may be used to adapt an automated essay scoring system to new writing assessments "on-the-fly" by using a small set of benchmark essay responses. A scoring model may be constructed from essay responses pertaining to a particular topic and/or essay responses that conform to an assessment framework. Essay responses may be scored based on assessment rubrics. In an embodiment, a scoring model based on computer-generated scores for essay responses may be incorporated into a scaling procedure. Human raters may review different scoring models, select an approximate scoring model, and adjust (scale) the scoring model by analyzing scored benchmark essay responses from that scoring model. In an embodiment, relative weights for essay response features may also be integrated into the modeling process. This process may be based on typical sets of weights.

In an embodiment, a method of customizing an automated essay scoring system may include assigning relative weights to a plurality of features for a plurality of benchmark essay responses, determining, based on the relative weights, automated scores for one or more first essay responses to a first prompt, scaling the automated scores based on one or more scoring standards for the first prompt, and assigning a scaled automated score for a second essay response to the first prompt based on the scaled automated scores for the one or more first essay responses.

In an embodiment, a processor-readable storage medium may contain one or more programming instructions for performing a method of customizing an automated essay scoring system. The method may include assigning relative weights to a plurality of features for a plurality of benchmark essay responses, determining, based on the relative weights, automated scores for one or more first essay responses to a first prompt, scaling the automated scores based on one or more scoring standards for the first prompt, and assigning a scaled automated score for a second essay response to the first prompt based on the scaled automated scores for the one or more first essay responses.

BRIEF DESCRIPTION OF THE DRAWINGS

Aspects, features, benefits and advantages of the present invention will be apparent with regard to the following description and accompanying drawings, of which.

DETAILED DESCRIPTION

A method of customizing a computer-based system designed to automatically score essay responses is described herein. In an embodiment, a scoring engine of an automated essay scoring system may analyze several features of an essay response and provide a score for the essay response based on particular features specified in holistic scoring rubrics. For example, the scoring rubrics may include a description of essay quality and/or writing competency at each score level of a multi-level scoring guide. The scoring engine may include an algorithm that assigns weights to one or more particular features of an essay response. In an embodiment, the algorithm may use a linear combination of feature weights or other scoring model parameters to determine scores for responses to a particular essay prompt.

Figure 1:
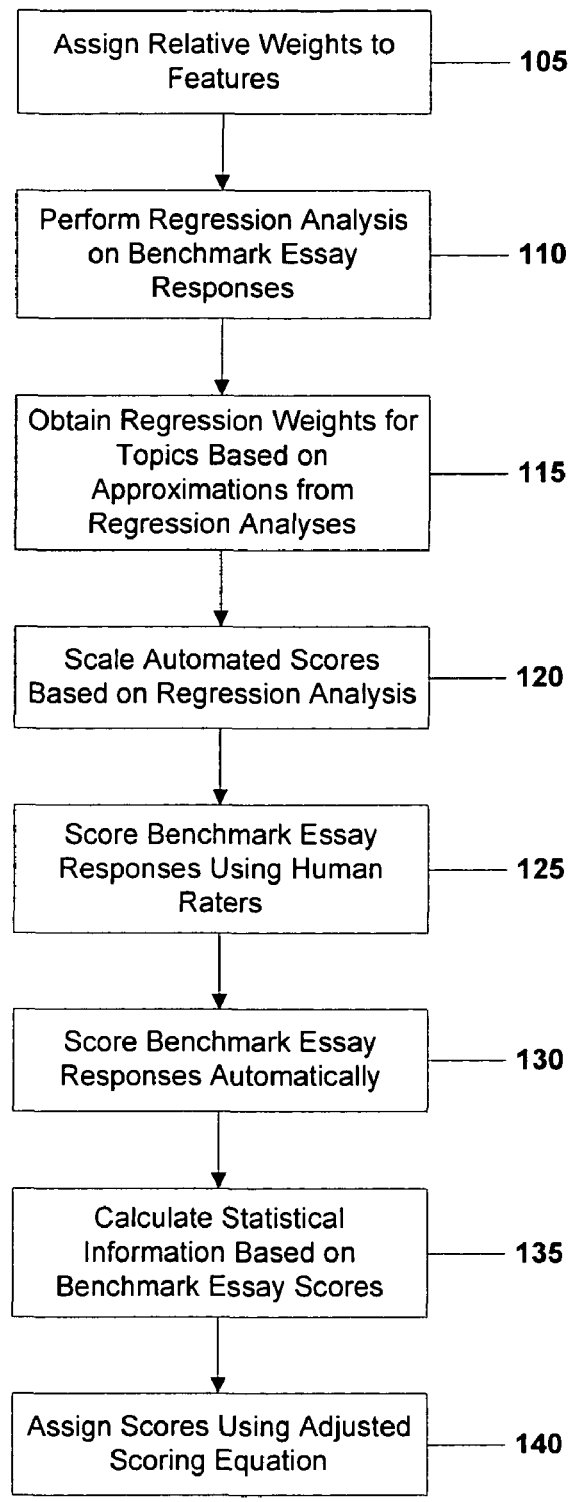
FIG. 1 is a flow diagram for customizing an exemplary system according to an embodiment.

FIG. 1 displays a flow diagram of an exemplary method for customizing an automated essay grading system according to an embodiment. As shown in FIG. 1, the method may assign relative weights 105 to a plurality of features of an automated essay scoring system. The weights may reflect the importance of the features to a score assigned to an essay response. One or more automated scores may be assigned based on the relative weights.

In an embodiment, determining the relative importance of the features used in an automated essay scoring system may be accomplished by performing regression analysis 110 on a set of essay responses for which human rater scores are available to yield statistically optimal weights. Such an analysis may require a large number of essay responses to obtain stable coefficients for each essay prompt that is modeled. In an embodiment, regression weights for each topic may be obtained by using approximations 115 developed from regression analyses performed on other topics. These approximations may produce results as accurate and effective as if regression weights were generated via regression analyses for each topic. Accordingly, a single large-scale regression analysis may be performed once for a group of related essay prompts.

In an embodiment, automated scores for essay responses to an essay prompt may be scaled 120 to match the scoring standards of an assessment based on human rater scores and computer-generated scores to a benchmark set of essay responses. The scaling 120 of the automated scores may be performed with respect to the large-scale regression analysis.

Benchmark essay responses may be essay responses responding to the essay prompt under consideration and/or essay responses responding to a similar essay prompt. In an embodiment, about 10 to about 50 benchmark essay responses may be used. In an embodiment, about 20 to about 30 benchmark essay responses may be used. In an embodiment, about 2 to about 10 human raters may score the essay responses. In an embodiment, about 2 to about 5 human raters may score the essay responses.

Benchmark essay responses may be automatically scored 125 according to the standards of the essay prompt currently being considered using human raters. An automated essay scoring system may also generate 130 computer-generated scores for the benchmark essay responses based on an initial scoring model. The initial scoring model may be generated based on essay responses to a different essay prompt or to the essay prompt under consideration.

After all of the scores (i.e., human rater scores and computer-generated scores) are obtained, statistical information, such as the mean and standard deviation for each of the human rater scores and the computer-generated scores, may be calculated 135. The initial scoring model may be adjusted 140 based on the statistical information. In an embodiment, the initial scoring model may be adjusted 140 based on the mean of the human rater scores for the benchmark essay responses, the mean of the computer-generated scores for the benchmark essay responses using the initial scoring model, the standard deviation of the human rater scores for the benchmark essay responses, and the standard deviation of the computer-generated scores for the benchmark essay responses using the initial scoring model. An adjusted (scaled) score $E_S$ may be related to a computer-generated score EA for the same essay response by the following equation:

$$E_S = \frac{S_H}{S_A}(E_A - M_A) + M_H,$$

where $S_H$, $M_H$, $S_A$, and $M_A$ are the standard deviation and mean of the benchmark human rater scores and the computer-generated scores, respectively.

Finally, the adjusted scoring model may be used as the basis for assigning 145 scores to essay responses pertaining to the essay prompt under consideration.

A method of determining the number of essay responses to use as benchmark essay responses and/or the number of human raters that score each benchmark essay response is also disclosed. In an embodiment, scaling the initial scoring model may be based on the discrepancy between the means of the human rater scores and the computer-generated scores. The standard deviation of the score means ($\sigma_M$) may be estimated from a single sample by the following equation:

$$\sigma_M = \frac{\sigma_x}{\sqrt{n}},$$

where $\sigma_x$ is the standard deviation of the essay response scores and n is the number of essay responses considered.

In an embodiment, each human rater score may be related to a computer-generated score if each pertains to the same essay response. Accordingly, the conditional distributions of the human rater scores with respect to the computer-generated scores may have less variability than the standard deviation of a random sample of human rater scores. The standard deviation of the human rater scores may equal the standard error of estimating human rater scores from computer-generated scores. The standard error of estimate when predicting a human rater score H' from a given value computer-generated score E may be denoted $\sigma_{H.E.}$ and may be computed using the following equation:

$$\sigma_{H.E.} = \sigma_H \sqrt{1 - \rho_{HE}^2},$$

where $\sigma_H$ is the standard deviation of the human rater scores and $\rho_{HE}$ is the correlation between human rater scores and computer-generated scores.

In an embodiment, the correlation between human rater scores and computer-generated scores may be dependent on the number of human raters used to produce the human rater scores. This may assume that the human rater scores are set to the average of all human ratings. This correlation may be computed using the following equation:

$$\rho_{HE} = \frac{k\rho_{SE}}{1 + (k-1)\rho_{SE}},$$

where k is the number of human raters and $\rho_{SE}$ is the correlation between a single set of human rater and computer-generated scores.

The standard error of the mean of the human rater scores that are assigned to the scaling sample may thus be computed using the following equation:

$$\sigma_M = \frac{\sigma_{H.E.}}{\sqrt{n}} = \frac{\sigma_H \sqrt{1 - \rho_{HE}^2}}{\sqrt{n}} = \frac{\sigma_H \sqrt{1 - \left[\frac{k\rho_{SE}}{1 + (k-1)\rho_{SE}}\right]^2}}{\sqrt{n}}.$$

As such, parameters that affect the size of $\sigma_M$ may include the number of essay responses considered (n) and the number of human raters that score each essay response (k). The standard deviation of human rater scores $\sigma_H$ and the correlation between a single human rater score and e-rater scores $\rho_{SE}$ may be regarded as constants for a specific essay prompt.

Accordingly, in a regression model, $\sigma_M$ may not depend upon the value of E. As such, the distribution of computer-generated scores that form the scaling sample may not affect the computation of $\sigma_M$. For example, if only essay responses having mid-range scores are selected, no loss of precision may result with respect to the computation of $\sigma_M$.

Figure 2:
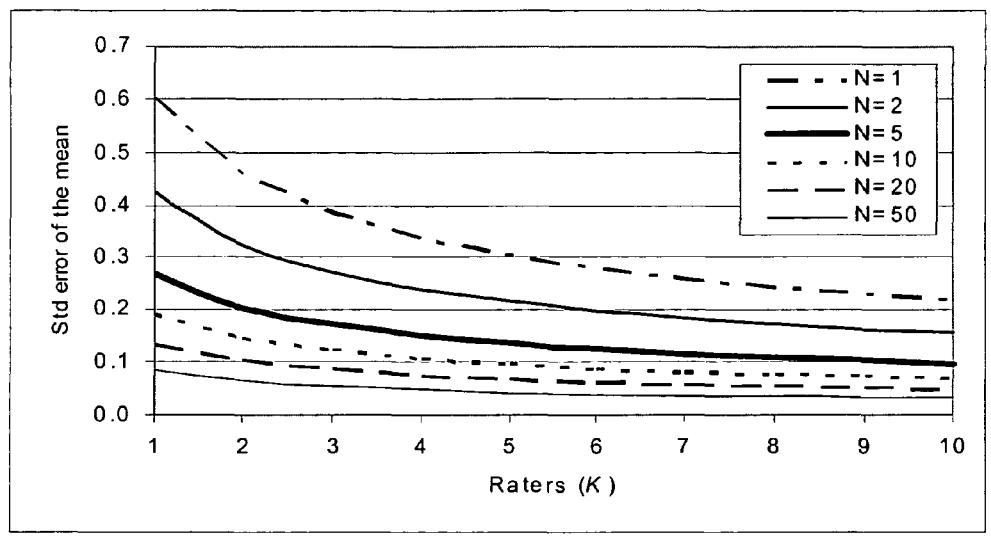
FIG. 2 depicts a graphical analysis of an exemplary standard error for the mean of computer-generated essay responses based on the sample size (N) and the number of human raters according to an embodiment.

FIG. 2 depicts exemplary values of $\sigma_M$ for typical values of n and k, where $\sigma_H$ is set to 1.2 points and $\rho_{SE}$ is set to 0.80. The effect on $\sigma_M$ may be slight when using, for example, more than approximately 20 essay responses and more than approximately 5 human raters. For example, as shown in FIG. 2, $\sigma_M$ equals 0.08 for 20 essay responses and 5 raters, and 0.05 for 50 essay responses and 5 raters. Accordingly, in an embodiment, about 20 to about 30 benchmark essay responses may be considered and about 2 to about 5 human raters may score the essay responses.

Figure 3:
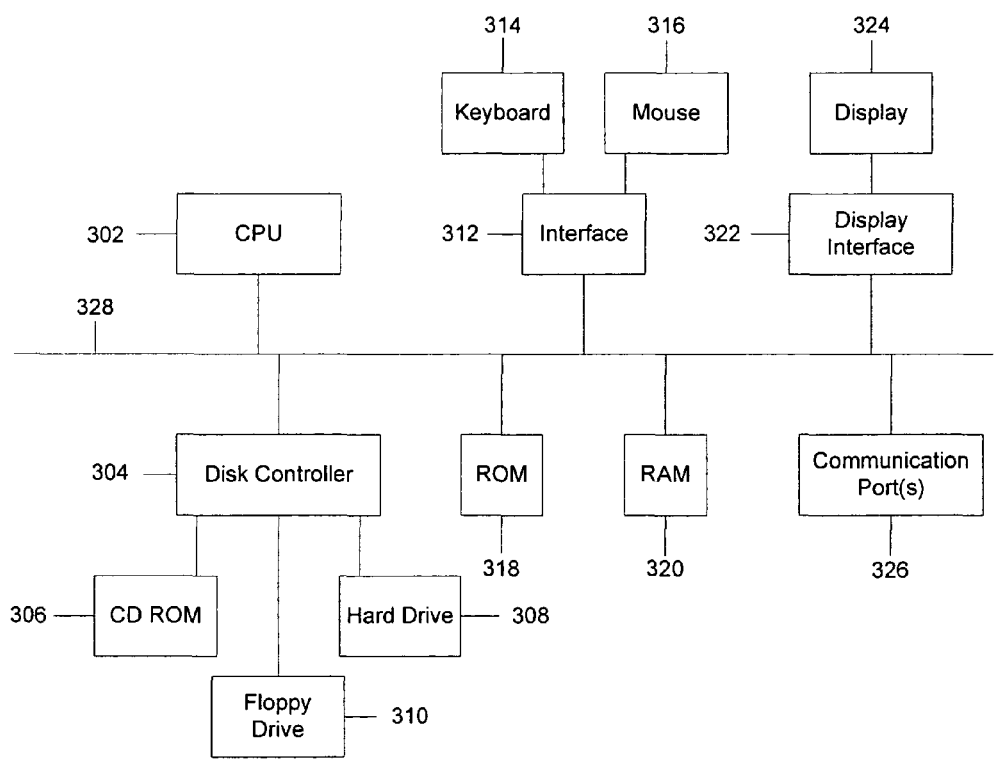
FIG. 3 is a block diagram of exemplary internal hardware that may be used to contain or implement the program instructions of a system embodiment.

FIG. 3 is a block diagram of exemplary hardware that may be used to contain or implement the program instructions of a system embodiment. Referring to FIG. 3, a bus 328 serves as the main information highway interconnecting the other illustrated components of the hardware. CPU 302 is the central processing unit of the system, performing calculations and logic operations required to execute a program. Read only memory (ROM) 318 and random access memory (RAM) 320 constitute exemplary memory devices.

A disk controller 304 interfaces with one or more optional disk drives to the system bus 328. These disk drives may be external or internal floppy disk drives such as 310, CD ROM drives 306, or external or internal hard drives 308. As indicated previously, these various disk drives and disk controllers are optional devices.

Program instructions may be stored in the ROM 318 and/or the RAM 320. Optionally, program instructions may be stored on a computer readable medium such as a floppy disk or a digital disk or other recording medium, a communications signal or a carrier wave.

An optional display interface 322 may permit information from the bus 328 to be displayed on the display 324 in audio, graphic or alphanumeric format. Communication with external devices may optionally occur using various communication ports 326. An exemplary communication port 326 may be attached to a communications network, such as the Internet or an intranet.

In addition to the standard computer-type components, the hardware may also include an interface 312 which allows for receipt of data from input devices such as a keyboard 314 or other input device 316 such as a remote control, pointer and/or joystick.

An embedded system may optionally be used to perform one, some or all of the described operations. Likewise, a multiprocessor system may optionally be used to perform one, some or all of the described operations.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A computer-implemented method of customizing an automated essay scoring system, the method comprising:
   assigning, using a processing system, relative weights to a plurality of features for a plurality of benchmark essay responses by using approximations calculated from performing regression analysis on essay responses responding to one or more essay prompts on other topics;
   determining, based on the relative weights, automated scores for one or more first essays responsive to a first prompt using the processing system;
   transforming the automated scores into scaled automated scores based on comparing statistical information for both human rater scores and the automated scores using the processing system, the scaled automated scores being representative of essay quality or writing competency; and
   assigning a scaled automated score for a second essay response to the first prompt based on the scaled automated scores for the one or more first essay responses using the processing system;
   wherein transforming the automated scores into scaled automated scores comprises:
      receiving human rater scores for one or more benchmark essay responses;
      calculating human rater statistical information based on the human rater scores and automated statistical information based on the automated scores; and
      automatically adjusting the automated scores using the processing system based on the human rater statistical information and the automated statistical information,
   wherein the human rater statistical information comprises a mean for the human rater scores ($M_H$) and a standard deviation for the human rater scores ($S_H$), and wherein the automated statistical information comprises a mean for the automated scores ($M_A$) and a standard deviation for the automated scores ($S_A$), wherein assigning a scaled automated score for a second essay response comprises:
calculating the quantity $(S_H/S_A)(E_A-M_A)+M_H$, wherein $E_A$ is the automated score for the second essay response; and
assigning the scaled automated score for the second essay response based on the quantity $(S_H/S_A)(E_A-M_A)+M_H$.

2. A non-transitory computer-readable storage medium comprising one or more programming instructions for customizing an automated essay scoring system, the programming instructions when executed causing a processing system to carry out steps comprising:
assigning relative weights to a plurality of features for a plurality of benchmark essay responses by using approximations calculated from performing regression analysis on essay responses responding to one or more essay prompts on other topics;
determining, based on the relative weights, automated scores for one or more first essays responsive to a first prompt;
transforming the automated scores into scaled automated scores based on comparing statistical information for both human rater scores and the automated scores, the scaled automated scores being representative of essay quality or writing competency; and
assigning a scaled automated score for a second essay response to the first prompt based on the scaled automated scores for the one or more first essay responses;
wherein transforming the automated scores into scaled automated scores comprises:
receiving human rater scores for one or more benchmark essay responses;
calculating human rater statistical information based on the human rater scores and automated statistical information based on the automated scores; and
automatically adjusting the automated scores using a processor based on the human rater statistical information and the automated statistical information,
wherein the human rater statistical information comprises a mean for the human rater scores ($M_H$) and a standard deviation for the human rater scores ($S_H$), wherein the automated statistical information comprises a mean for the automated scores ($M_A$) and a standard deviation for the automated scores ($S_A$),
wherein assigning a scaled automated score for a second essay response comprises:
calculating the quantity $(S_H/S_A)(E_A-M_A)+M_H$, wherein $E_A$ is the automated score for the second essay response; and
assigning the scaled automated score for the second essay response based on the quantity $(S_H/S_A)(E_A-M_A)+M_H$.

3. A computer-implemented method of customizing an automated essay scoring system, the method comprising:
assigning, using a processing system, relative weights to a plurality of features for a plurality of benchmark essay responses by using approximations calculated from performing regression analysis on essay responses responding to one or more essay prompts on other topics;
determining, based on the relative weights, automated scores for one or more first essays responsive to a first prompt using the processing system;
transforming the automated scores into scaled automated scores based on comparing statistical information for both human rater scores and the automated scores using the processing system, the scaled automated scores being representative of essay quality or writing competency; and
assigning a scaled automated score for a second essay response to the first prompt based on the scaled automated scores for the one or more first essay responses using the processing system;
wherein transforming the automated scores into scaled automated scores comprises:
receiving human rater scores for one or more benchmark essay responses;
calculating human rater statistical information based on the human rater scores and automated statistical information based on the automated scores; and
automatically adjusting the automated scores using the processing system based on the human rater statistical information and the automated statistical information,
wherein assigning relative weights uses human scored benchmark essay responses,
wherein assigning relative weights comprises using n number of human scored benchmark essay responses scored by each of k human raters, wherein n and k are selected to satisfy the inequality:

$$0.08 \geq \frac{\sqrt[1.2]{1-\left[\frac{0.8k}{1+(k-1)0.8}\right]^2}}{\sqrt{n}}.$$

4. A computer-implemented method of customizing an automated essay scoring system, the method comprising:
assigning, using a processing system, relative weights to a plurality of features for a plurality of benchmark essay responses by using approximations calculated from performing regression analysis on essay responses responding to one or more essay prompts on other topics;
determining, based on the relative weights, automated scores for one or more first essays responsive to a first prompt using the processing system;
transforming the automated scores into scaled automated scores based on comparing statistical information for both human rater scores and the automated scores using the processing system, the scaled automated scores being representative of essay quality or writing competency; and
assigning a scaled automated score for a second essay response to the first prompt based on the scaled automated scores for the one or more first essay responses using the processing system;
wherein transforming the automated scores into scaled automated scores comprises:
receiving human rater scores for one or more benchmark essay responses;
calculating human rater statistical information based on the human rater scores and automated statistical information based on the automated scores; and
automatically adjusting the automated scores using the processing system based on the human rater statistical information and the automated statistical information,
wherein assigning relative weights uses human scored benchmark essay responses,
wherein assigning relative weights comprises using n number of human scored benchmark essay responses scored by each of k human raters, wherein n and k are selected to satisfy the inequality:

$$0.05 \geq \frac{\sqrt[1.2]{1 - \left[\frac{0.8k}{1 + (k-1)0.8}\right]^2}}{\sqrt{n}}.$$

5. A non-transitory computer-readable storage medium comprising one or more programming instructions for customizing an automated essay scoring system, the programming instructions when executed causing a processing system to carry out steps comprising:
  assigning relative weights to a plurality of features for a plurality of benchmark essay responses by using approximations calculated from performing regression analysis on essay responses responding to one or more essay prompts on other topics;
  determining, based on the relative weights, automated scores for one or more first essays responsive to a first prompt;
  transforming the automated scores into scaled automated scores based on comparing statistical information for both human rater scores and the automated scores, the scaled automated scores being representative of essay quality or writing competency; and
  assigning a scaled automated score for a second essay response to the first prompt based on the scaled automated scores for the one or more first essay responses;
  wherein transforming the automated scores into scaled automated scores comprises:
    receiving human rater scores for one or more benchmark essay responses;
    calculating human rater statistical information based on the human rater scores and automated statistical information based on the automated scores; and
    automatically adjusting the automated scores using a processor based on the human rater statistical information and the automated statistical information,
  wherein assigning relative weights uses human scored benchmark essay responses,
  wherein assigning relative weights comprises using n number of human scored benchmark essay responses scored by each of k human raters, wherein n and k are selected to satisfy the inequality:

$$0.08 \geq \frac{\sqrt[1.2]{1 - \left[\frac{0.8k}{1 + (k-1)0.8}\right]^2}}{\sqrt{n}}.$$

6. A non-transitory computer-readable storage medium comprising one or more programming instructions for customizing an automated essay scoring system, the programming instructions when executed causing a processing system to carry out steps comprising:
  assigning relative weights to a plurality of features for a plurality of benchmark essay responses by using approximations calculated from performing regression analysis on essay responses responding to one or more essay prompts on other topics;
  determining, based on the relative weights, automated scores for one or more first essays responsive to a first prompt;
  transforming the automated scores into scaled automated scores based on comparing statistical information for both human rater scores and the automated scores, the scaled automated scores being representative of essay quality or writing competency; and
  assigning a scaled automated score for a second essay response to the first prompt based on the scaled automated scores for the one or more first essay responses;
  wherein transforming the automated scores into scaled automated scores comprises:
    receiving human rater scores for one or more benchmark essay responses;
    calculating human rater statistical information based on the human rater scores and automated statistical information based on the automated scores; and
    automatically adjusting the automated scores using a processor based on the human rater statistical information and the automated statistical information,
  wherein assigning relative weights uses human scored benchmark essay responses,
  wherein assigning relative weights comprises using n number of human scored benchmark essay responses scored by each of k human raters, wherein n and k are selected to satisfy the inequality:

$$0.05 \geq \frac{\sqrt[1.2]{1 - \left[\frac{0.8k}{1 + (k-1)0.8}\right]^2}}{\sqrt{n}}.$$

7. A system for customizing an automated essay scoring system, the system comprising:
  a processing system;
  a computer-readable memory comprising instructions for causing the processing system to execute steps comprising:
    assigning relative weights to a plurality of features for a plurality of benchmark essay responses by using approximations calculated from performing regression analysis on essay responses responding to one or more essay prompts on other topics;
    determining, based on the relative weights, automated scores for one or more first essays responsive to a first prompt;
    transforming the automated scores into scaled automated scores based on comparing statistical information for both human rater scores and the automated scores, the scaled automated scores being representative of essay quality or writing competency; and
    assigning a scaled automated score for a second essay response to the first prompt based on the scaled automated scores for the one or more first essay responses;
    wherein transforming the automated scores into scaled automated scores comprises:
      receiving human rater scores for one or more benchmark essay responses;
      calculating human rater statistical information based on the human rater scores and automated statistical information based on the automated scores; and
      automatically adjusting the automated scores using the processor based on the human rater statistical information and the automated statistical information,
    wherein the human rater statistical information comprises a mean for the human rater scores ($M_H$) and a standard deviation for the human rater scores ($S_H$), and wherein the automated statistical information comprises a mean for the automated scores ($M_A$) and a standard deviation for the automated scores ($S_A$), wherein assigning a scaled automated score for a second essay response comprises:

calculating the quantity $(S_H/S_A)(E_A-M_A)+M_H$, wherein $E_A$ is the automated score for the second essay response; and assigning the scaled automated score for the second essay response based on the quality $(S_H/S_A)(E_A-M_A)+M_H$.

8. A system for customizing an automated essay scoring system, the system comprising:

a processing system;

a computer-readable memory comprising instructions for causing the processing system to execute steps comprising:

assigning relative weights to a plurality of features for a plurality of benchmark essay responses by using approximations calculated from performing regression analysis on essay responses responding to one or more essay prompts on other topics;

determining, based on the relative weights, automated scores for one or more first essays responsive to a first prompt;

transforming the automated scores into scaled automated scores based on comparing statistical information for both human rater scores and the automated scores, the scaled automated scores being representative of essay quality or writing competency; and assigning a scaled automated score for a second essay response to the first prompt based on the scaled automated scores for the one or more first essay responses;

wherein transforming the automated scores into scaled automated scores comprises:

receiving human rater scores for one or more benchmark essay responses;

calculating human rater statistical information based on the human rater scores and automated statistical information based on the automated scores; and automatically adjusting the automated scores using the processor based on the human rater statistical information and the automated statistical information, wherein assigning relative weights uses human scored benchmark essay responses, wherein assigning relative weights comprises using n number of human scored benchmark essay responses scored by each of k human raters, wherein n and k are selected to satisfy the inequality:

$$0.08 \geq \frac{\sqrt[1.2]{1 - \left[\frac{0.8k}{1 + (k-1)0.8}\right]^2}}{\sqrt{n}}.$$

9. A system for customizing an automated essay scoring system, the system comprising:

a processing system;

a computer-readable memory comprising instructions for causing the processing system to execute steps comprising:

assigning relative weights to a plurality of features for a plurality of benchmark essay responses by using approximations calculated from performing regression analysis on essay responses responding to one or more essay prompts on other topics;

determining, based on the relative weights, automated scores for one or more first essays responsive to a first prompt;

transforming the automated scores into scaled automated scores based on comparing statistical information for both human rater scores and the automated scores, the scaled automated scores being representative of essay quality or writing competency: and assigning a scaled automated score for a second essay response to the first prompt based on the scaled automated scores for the one or more first essay responses;

wherein transforming the automated scores into scaled automated scores comprises:

receiving human rater scores for one or more benchmark essay responses;

calculating human rater statistical information based on the human rater scores and automated statistical information based on the automated scores; and automatically adjusting the automated scores using the processor based on the human rater statistical information and the automated statistical information, wherein assigning relative weights uses human scored benchmark essay responses, wherein assigning relative weights comprises using n number of human scored benchmark essay responses scored by each of k human raters, wherein n and k are selected to satisfy the inequality:

$$0.05 \geq \frac{\sqrt[1.2]{1 - \left[\frac{0.8k}{1 + (k-1)0.8}\right]^2}}{\sqrt{n}}.$$

\* \* \* \* \*